Sept. 16, 1958 P. K. ECKHARDT 2,852,760

CODED CARRIER REMOTE CONTROL SYSTEMS

Filed May 29, 1953 2 Sheets-Sheet 1

INVENTOR.
Paul K. Eckhardt
BY W. L. Stout
HIS ATTORNEY

CODED CARRIER REMOTE CONTROL SYSTEMS

Filed May 29, 1953 2 Sheets-Sheet 2

INVENTOR.
Paul K. Eckhardt
BY W. L. Stout
HIS ATTORNEY

United States Patent Office 2,852,760

Patented Sept. 16, 1958

2,852,760

CODED CARRIER REMOTE CONTROL SYSTEMS

Paul K. Eckhardt, Sharpsburg, Pa., assignor to Westinghouse Air Brake Company, Wilmerding, Pa., a corporation of Pennsylvania Application May 29, 1953, Serial No. 358,334

12 Claims. (Cl. 340—163)

Figure 1:
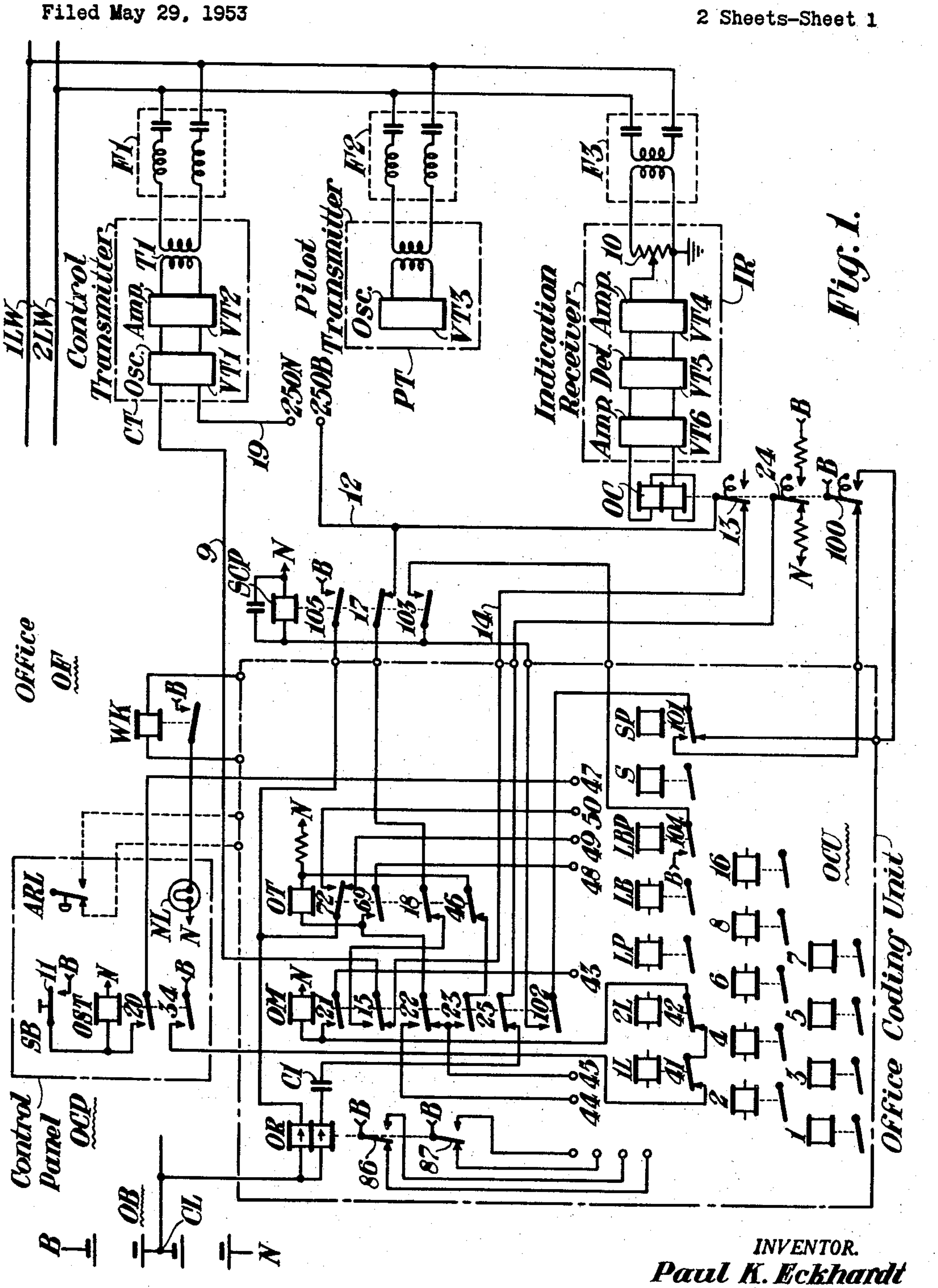

My invention relates to coded carrier remote control systems and particularly to systems for controlling and indicating the different devices at a plurality of spaced stations from a remote office by coded carrier current, a carrier current being taken as a periodic current of a frequency above the usual voice frequency range commonly used in commercial circuits.

In control systems of the type here contemplated several different functions or devices at each of two or more stations spaced apart are operated by local energy controlled from a remote office. For example, on railroads the track switches and wayside signals at individual locations or field stations along a railroad are operated by energy supplied by sources at the individual locations but controlled from a remote office. Such control systems using direct current coded on the time element principle are widely used on railroads. In these railway control systems each code consists of a given number of long and short impulses of direct current arranged in different patterns, each of which patterns selects a designated station and a designated device or devices at the selected station. In one system having extensive use the codes comprise 8 impulses and 8 spaces or 16 code steps, of which the first eight steps are used for station selection and the last eight steps are used to select designated functions at the selected station. In these systems the position and condition of the functions and devices of each station are indicated to the office by similar codes sent by the different stations to the control office, each indication code selecting an indicator which identifies the station and function.

Ordinarily, a line circuit is used for transmitting the coded current between the office and the field stations, the arrangement being such that only one code is sent at a time.

Remote control systems using alternating current have been proposed, an alternating current of a first frequency being used for the control codes sent from the office to the stations. In these systems, one method that has been proposed for providing indications for the different stations and devices is to provide an alternating current of a different frequency for each station, each alternating current being coded according to the different functions at the station. Such an arrangement requires a large frequency spectrum when a number of stations are involved. However, it is always desirable to conserve the available frequency spectrum. When a line circuit is used as the transmitting medium for the currents, it is particularly desirable to use a single indication frequency in order to avoid the necessity for repeater equipment to cover a multiplicity of frequencies. Also because of the general use of line circuits, in order to avoid an excessive number of repeater locations, it is desirable that the frequency used for such remote control systems be in a narrow band just above the voice frequency range. Thus the frequencies used must be fitted in the narrow band spaces left vacant by the frequencies used for other communication carrier circuits.

In view of the fact that this limits the available frequencies and that it is desirable to conserve the frequency spectrum in any case, it is therefore advantageous to have all stations of a remote control system use the same frequency for indicating. Then, the problem is either to provide means that assure that the currents generated at the different field stations are identical in frequency and phase, so as not to have a cancelling effect on each other, or to arrange the circuits so that the cancelling effect can be detected and eliminated.

Furthermore, in these remote control systems it is desirable to enable each field station to initiate the sending of an indication code at any time. This presents the problem of coordination in the sending of the control and indication codes so that a station will delay the sending of an indication code while the office is sending a control code. Also, when two or more stations attempt to send indication codes simultaneously, only one station can be permitted to complete the sending of its code and the remaining stations must wait their turn before transmitting.

In view of the foregoing problems in remote control systems using coded carrier current, an object of my invention is the provision of a novel and improved remote control system using coded carrier current.

A further object of my invention is the provision of improved apparatus for a coded carrier remote control system which enables the use of codes based on the time element principle.

A feature of my invention is the provision of a coded carrier remote control system embodying novel apparatus for coordination of the office and station equipments.

A specific feature of my invention is the provision of a coded carrier remote control system wherein the office equipment retransmits the indication code received from a station to check step-by-step and coordinate the sending of indication codes from different stations, the retransmitted code causing all stations but a selected station to become ineffective to transmit a code.

Again a feature of the invention is the provision of novel means whereby two or more stations attempting to send indication codes simultaneously are separated and made to transmit their codes one at a time.

Another object of the invention is the provision of means to prevent the loss of a control code and the incorrect registry of any code initiated while two or more stations are in the process of separation.

Further objects, features and advantages of the apparatus embodying my invention will appear as the specification progresses.

In the system herein described I obtain the foregoing objects, features and advantages of my invention by the provision of a novel and improved arrangement of a carrier transmitter and receiver, coding unit, control panel, and circuit network at the office and at each of the stations involved. The office transmitter is made normally active to supply a noncoded carrier and a control code is effected by keying the transmitter according to the desired code pattern. Each control carrier receiver of the system is conditioned ready to receive and hence each control code when transmitted is received at each of the stations. The indication transmitter or generator at each of the field stations is energized but inactive or suppressed and is made active and keyed only when an indication code is to be sent from that station. It is to be understood that my invention also includes the system wherein the office transmitter is normally inactive and control carrier is supplied only when the transmitter is keyed according to the desired code pattern.

Where space in the frequency spectrum permits, a pilot carrier is constantly supplied to the transmitting medium or line circuit and is available at each wayside station for energizing a pilot receiver which in turn determines the frequency placed on the circuit by the indication generator or transmitter. Thus the indication carrier generated at each station is based on an exact multiple of the pilot carrier and the currents are identical and substantially in phase. The use of pilot carrier in such a manner is the subject matter of a copending application for Letters Patent of the United States Serial No. 312,341, filed September 30, 1952, by Alexander Finlay for Coded Carrier Remote Control Systems, now Patent No. 2,735,083, issued February 14, 1956, this patent and this application being of common ownership. That is to say, this use of a pilot carrier, to assure that the indication carriers generated at all stations are identical in frequency and are in phase, is not my invention and is not claimed in this application. Where the spectrum is already crowded by other communication circuits and difficulty is present in locating the pilot, new and novel circuits are used to check against indication carrier currents that might be out of phase because the pilot cannot be afforded.

The coding unit at the office and at each station includes timing and counting relay chains which are adaptable for receiving or transmitting according as the master relay associated therewith is released or picked up. During the sending period each coding unit is connected to the transmitter of the same location in such a manner as to key the oscillator or generator on the time element principle, in this example, and thereby form a code group of timed pulses of the carrier current separated by timed spaces. Each pulse or space is known as a code step, and will thus be designated hereinafter. Each group of code steps is made to consist of a selected number of short and long steps, the short and long steps being arranged in different code patterns as determined by the station setting of the coding unit and by the corresponding control panel, in the case of control codes, or controlled devices, in indication codes. Although the coding units hereinafter described are the well known type including timing and counting relay chains, other types of coding units may be used. These other types include electronic and time delay systems of coding, and are not necessarily limited to those producing codes based on the time element principle.

The oscillator of the office control transmitter is adapted to supply a carrier of a first or control frequency which I shall refer to as a frequency $f1$. This control carrier sent from the office is applied to the control receiver of each field station by a single transmitting medium which is here considered as a two-wire line circuit, the connection of each control receiver to the line circuit including a filter having elements tuned to pass current of frequency $f1$ and to substantially suppress other frequencies. It is to be understood that the system is not limited to a two-wire line circuit as the transmitting medium between office and field stations. Other transmitting mediums such as space radio or very high frequency carrier systems may be used and their use is included in this application.

Each station control receiver includes a detector which is responsive to the control carrier and which is connected to a code following relay, this relay being operated in correspondence with the code of the control carrier current. Each station code following relay is in turn connected to the coding unit of the station in such a manner that the relay chains of the unit are operated to decode the coded carrier and determine if its station is the station desired and to selectively energize a group of control relays when it is the desired station. These control relays at each of the stations are used to selectively govern the operating circuits of the different operating devices or functions of the station. The control relays at all of the non-desired stations remain in their last set position because each coding unit responds only to a particular station code.

Each station is provided with an indication generator adapted to supply a carrier of a second frequency, which I shall refer to as frequency $f3$, the frequency of $f3$ being different from the control frequency $f1$. The coding unit of each station is connected to the indication generator of the same station in such a manner as to key, that is, to start and stop the indication carrier according to short and long intervals determined by the operation of the coding unit, the operation of the coding unit being determined by contacts actuated by the devices or functions of the station.

As stated hereinbefore, in one form of my invention a pilot carrier, of a frequency which I shall call $f2$, is constantly supplied to the transmitting medium at the office or at some other convenient location. The pilot carrier thus supplied is received by a pilot receiver at each station and is used solely to determine the frequency and the phase of the indication carrier. The pilot carrier regulates each indication generator in such a manner that the indication currents supplied to the transmitting medium by the different stations are identical in frequency, which is an exact multiple of the pilot frequency $f2$, and are substantially in phase. In this form then, each station has a pilot frequency receiver associated with and controlling, from the standpoint of frequency and phase, its indication frequency generator, or indication transmitter, this transmitter being different in arrangement from the office control transmitter.

The office is provided with a receiver which is responsive to the indication current received from the transmitting medium through a filter tuned to pass current of the indication frequency $f3$ and to substantially suppress other frequencies. This office receiver includes a detector connected to a code following relay so that this relay is operated in correspondence with the code pattern of the indication carrier current. The office code following relay is made to do two things. First, it is connected to the office coding unit in such a manner that the relay chains of the coding unit are operated to interpret the pattern of the indication code and selectively energize a group of indication relays which in turn control indicators that identify the sending station and device or function. Second, the office code following relay is used to key the oscillator of the office transmitter so that the indication code is retransmitted step by step from the office on the control frequency. The retransmitted code is received at each of the station control receivers and the corresponding station code following relays are operated in step therewith. The operation of the code following relay at the stations in response to the retransmitted code is used to continue the sending of the indication code and for station coordination.

In the first form of my invention, the circuit arrangement at each station is such that when a station attempts to send an indication code while the office is sending a control code, the station sending apparatus is suppressed and made to wait until the completion of the sending of the control code from the office. Furthermore, when two or more stations attempt to send an indication code simultaneously, the code following relays at all of the stations except the preference station are eventually operated out of sequence with the station transmitter due to the retransmitted code from the office. This causes the less preferential stations to cease sending. Thus the indication codes are separated and proper reception at the office is assured.

When no available frequency can be assigned to the pilot carrier, a second form of my invention provides a novel circuit arrangement at each station to coordinate the transmission of control and indication codes. Particularly, if two or more stations simultaneously initiate indication codes, these circuits provide a selection of a preference station and force other stations to reset and store their codes until the transmitting medium is available to them. Because no pilot carrier controls the generation of the single indication frequency, the carriers supplied by different field stations are likely to be slightly different in frequency and phase. Thus the usual type of coordination cannot be relied upon and the circuit arrangement of my invention is necessary.

When these circuits are used, and two or more stations simultaneously initiate an indication code, disagreement occurs at each station between the coding unit and the retransmitted code previously described. This causes the transmission of the indication carrier to cease. The coding unit at each of the stations attempting to send an indication code is then operated by local interaction of the apparatus until a designated relay of the coding unit at any one of the stations is energized. The energizing of this designated relay causes the establishment of a preference for the coding action. That is, the first of such designated relays to be picked up causes the corresponding station to be the preference station. This station is then permitted to transmit its indication code and the other stations are made to await their turn. This separation action assures the proper reception of indication codes at the office and prevents the loss of any indications from field stations. A circuit arrangement at the office, also part of my invention, prevents the transmission of a control code to a field station locked out by the separating action so that no control codes can be lost or received by a wrong station.

If it is desired to increase the integrity of the system even when a pilot carrier is used, the second form of my invention may be used in conjunction with the use of a pilot carrier. This provides a very reliable check and coordination of all coding action. This would be particularly desirable when the transmitting medium is subject to severe and frequent momentary disturbances.

I shall now describe one form of apparatus for remote control systems embodying both previously mentioned forms of my invention with one modification and shall then point out the novel features thereof in claims.

In the accompanying drawings, Fig. 1 is a schematic diagram showing one form of apparatus that may be used at a central office of a system embodying the invention.

Figures 2, 2A:
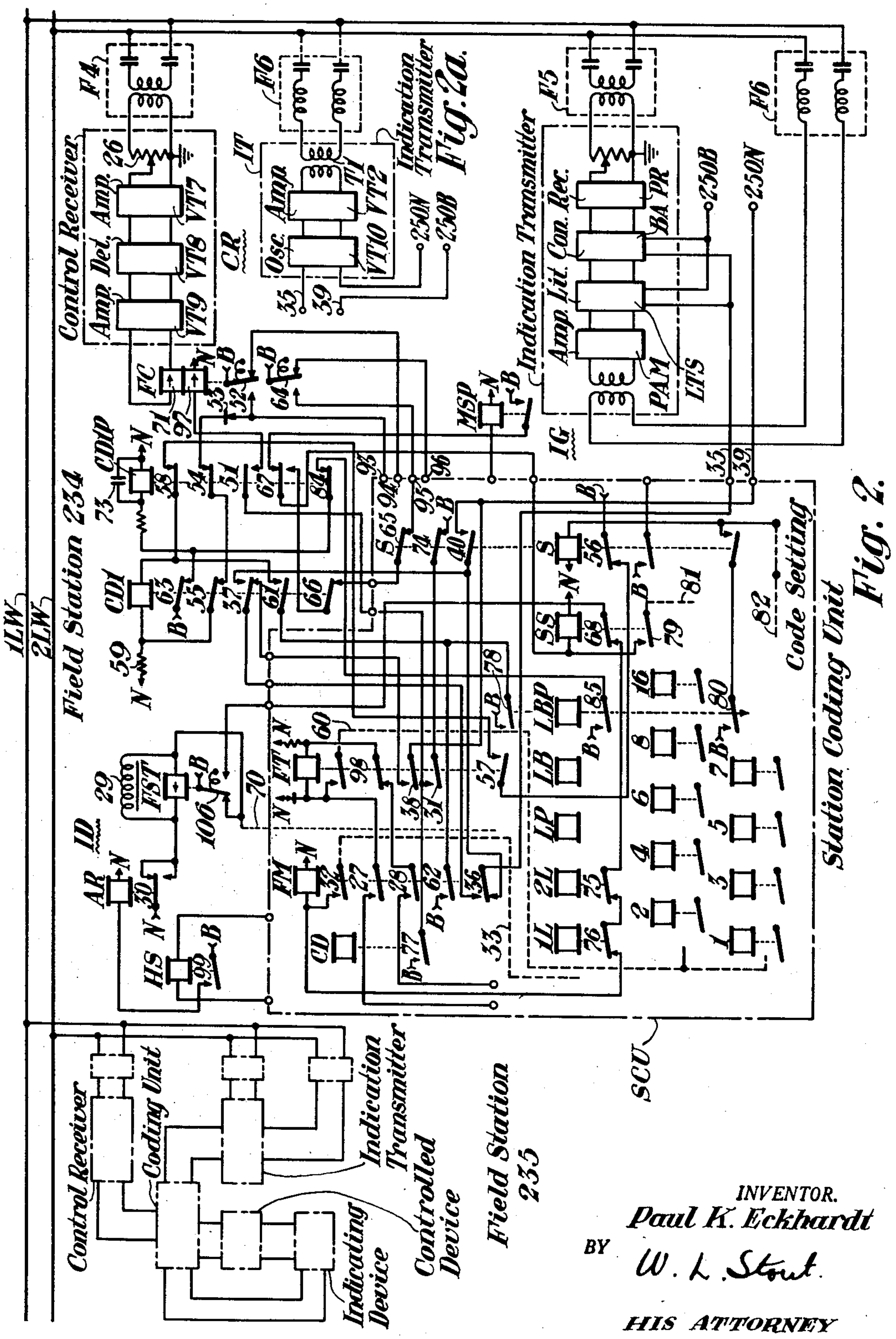

Fig. 2 is a schematic diagram showing one form of apparatus for a field station which cooperates with the apparatus of Fig. 1 and which field station apparatus would be duplicated at each field station of the system.

Fig. 2*a* is a schematic diagram of a different type of indication transmitter which replaces the indication transmitter of Fig. 2 when no pilot carrier is used.

In the different views like reference characters are used to designate similar parts.

Referring to Fig. 1, the reference characters 1LW and 2LW designate a pair of line wires of a line circuit extending to an office OF to a group of field stations to be referred to later, and which office and stations are provided with apparatus for a remote control system for controlling different devices or functions at each of the stations from the office and for indicating at the office the position and condition of the different station devices. This line circuit 1LW—2LW is used as the transmitting medium for transmitting the control and indication currents between the office and the stations. It is to be understood that the invention is not limited to the use of a line circuit as a transmitting medium and the transmission may be effected by space radio or any other suitable transmitting medium.

The equipment at the office OF includes a control transmitter CT and an indication receiver IR together with a pilot transmitter PT, as used in one form of my invention. The output of the transmitter CT and the output of the pilot transmitter PT and the input of the receiver IR in multiple are connected across the line circuit through filters F1, F2 and F3, respectively. The filter F1 includes inductance and capacitance tuned to pass only a control carrier frequency, which is here referred to as the frequency *f1*, and is designed so as not to load other carrier circuits. The filter F2 includes inductance and capacitance tuned to pass only a pilot carrier frequency which is here referred to as the frequency *f2*, and the filter F3 includes elements tuned to pass only an indication carrier frequency, here referred to as the frequency *f3*, and to suppress all other frequencies. As an aid in the understanding of the invention, the control frequency *f1* may be of the order of 9 kc., the pilot frequency *f2* may be of the order of 12.5 kc., and the indication frequency *f3* may be double the pilot carrier frequency in which case it would be 25 kc. with a pilot carrier of 12.5 kc. It is to be understood, however, that the invention is not limited to these carrier frequencies and other frequencies can be used.

It should be pointed out that the office OF and each of the field stations are provided with a local source of current which is adapted to supply current at different voltages suitable for different circuits of electron tubes and for control purposes. Preferably, the current source is a direct current source having positive and negative terminals 250B and 250N, respectively, from which current of the voltage of the order of 250 volts may be obtained for anode circuits of the electron tubes of the apparatus. Furthermore, the current source would be provided with positive terminal B and negative terminal N from which a relatively low voltage may be obtained for heater circuits of electron tubes and for control purposes.

The control transmitter CT of Fig. 1 comprises an oscillator VT1 adapted to generate the carrier frequency *f1* and a buffer amplifier VT2 adapted to amplify the carrier output of the oscillator VT1 to a desired energy level, the final output in turn being supplied through a transformer T1 and the filter F1 to the line circuit. The oscillator VT1 is shown in block form because it may be any one of several arrangements and it may be an electron tube oscillator similar to that disclosed in the previously mentioned Finlay Patent No. 2,735,083, which is directed to remote control apparatus having an operative relationship.

It is sufficient for the present application to point out that the oscillator VT1 is preferably a resistance stabilized electron tube oscillator which is provided with an anode circuit including terminal 250B of the source of current and two alternative paths. The first path includes wire 12, a normal or left-hand contact 13 of a code following relay OC to be referred to later, wire 14, back contact 15 of a relay OM also to be referred to later, wire 9, the anode path of the electron tube, not shown, of the oscillator VT1, wire 19, and the negative terminal 250N of the power source. The second path can be traced from terminal 250B through wire 12, back contact 17 of relay SCP, back contact 18 of a relay OT, front contact 15 of relay OM and thence as previously traced for the first path, the relays OT and SCP being described hereinafter. Thus, it is apparent that the carrier generated by the oscillator VT1 can be stopped and started on the on and off principle by operation either of the relay OC or the relay OT, depending upon the position of the contact 15 of relay OM. It follows that the transmitter CT is normally active to supply the non-coded carrier current to the line circuit and that the current can be coded by operation of either the relay OC or the relay OT, the relay OC being effetcive when the relay OM is released closing back contact 15 and the relay OT being effective when the relay OM is picked up closing front contact 15. The amplifier VT2 of the control transmitter CT may be of any suitable arrangement and it may be similar to the amplifier disclosed in the above-mentioned Alexander Finlay patent, it being understood that this amplifier is effective to amplify the output of the oscillator VT1 to a desired energy level.

The pilot transmitter PT includes an oscillator VT3 of any suitable form, but preferably it is of the electron tube type similar to the oscillator VT1. The oscillator VT3 is constantly active to supply the pilot carrier *f2* to the line circuit. The use of the pilot carrier constantly supplied to the line circuit is described in the Alexander Finlay patent and is a part of the invention disclosed therein. It is not a part of my invention and is here disclosed and described only for a better understanding of the operation of the apparatus of my invention and also for a better understanding of the operative relationship between the apparatus of my invention and that disclosed in the Alexander Finlay patent.

The indication receiver IR at the office OF comprises a carrier amplifier VT4, a detector VT5 and an amplifier VT6 connected in cascade. This indication receiver may also be similar to the receiver disclosed and described in the aforementioned Alexander Finlay patent. It is sufficient for the present application to describe this receiver only brifly, and it is to be pointed out that the filter F3 is connected across a load resistor 10 to a selected portion of which the input terminals of the amplifier VT4 are connected, the amplifier VT4 comprising one or more stages of amplification of a standard arrangement. The output of the amplifier VT4 is applied to the detector VT5 of a standard arrangement. Hence, the current output of the detector VT5 will have a wave form corresponding to the code of the carrier passed by the filter F3 and applied to the receiver. This wave of the output of the detector VT5 is applied to amplifier VT6, the output of which is in turn connected to the windings of the code following relay OC. Consequently the relay OC is energized and deenergized in correspondence with the code pulses of the carrier applied to the receiver. The relay OC is preferably a biased relay. The arrangement is such that when no carrier current is applied to the receiver IR, the relay OC is energized by the steady output of the amplifier VT6 and held at its normal or left-hand position against the force of the bias of the relay. Then, when a carrier pulse is supplied to the receiver IR, the output of the amplifier VT6 is reduced and the relay OC deenergized, allowing its contacts to be operated to their reverse position, that is, the right-hand position, by the bias force of the relay.

The office equipment also comprises a control panel OCP and a coding unit OCU, together with a cooperating circuit network. The coding unit OCU, control panel OCP, and associated relays and circuit network here provided are preferably similar to that used in present day remote control systems using coded direct current. They may be similar to that disclosed in Letters Patent of the United States No. 2,411,375, issued November 9, 1946, to Arthur P. Jackel for Remote Control Systems, and Letters Patent of the United States No. 2,574,774, issued November 13, 1951, to George W. Baughman, for Remote Control Systems, and furthermore to that described in Time Code Control System Manual 506A, reprinted October, 1950 by the Union Switch and Signal—Division of Westinghouse Air Brake Company. Reference is made to this printed art for a complete description of this portion of the equipment of the remote control system embodying my invention, and this portion of the equipment is shown and described only as needed for an understanding of my invention.

The control panel OCP is one of a group of control panels, each assigned to a particular field station of the system, the panel OCP being that provided for a station here referred to as field station 234. This control panel includes control levers, one for each of the functions of the corresponding station 234, and indication lamps for indicating the functions at this station. Of these devices only the one lever ARL and the one indication lamp NL are disclosed since these are sufficient for an understanding of the invention. The control panel OCP is also provided with a starting relay OST and a starting button SB. The starting relay OST is energized by a simple pickup circuit which includes contact 11 of the starting button SB when closed and then is retained energized by a stick circuit including its own front contact 20, terminal 47 of the coding unit OCU and the conventional circuit network, not shown, of the coding unit OCU, as fully set forth in the aforementioned printed art. Hence the starting relay OST, when once picked up by closing the starting button SB, is retained picked up until the station selection portion, that is, the first 8 steps, of the control code is completed. The starting relay OST is used to control the master relay OM, which is provided with a pickup circuit and a stick circuit, the pickup circuit including terminal B of the current source, front contact 34 of relay OST, back contacts 41 and 42 of two relays 1L and 2L, respectively, of the coding unit OCU, winding of the relay OM, and terminal N of the current source. The stick circuit for the relay OM includes its own front contact 21, terminal 43 of the unit OCU and a conventional network, not shown, of the unit. Hence this master relay OM is normally released and is picked up in response to the operation of the push button SB. The use of the master relay OM will be described shortly.

The coding unit OCU includes a group of timing relays shown conventionally as relays 1L, 2L, LP, LB and LBP; a chain of even relays 2, 4, 6, 8, and 16; a chain of odd relays 1, 3, 5, and 7; and other relays, two of which are indicated by the reference characters S and SP. The relay SCP is associated with the coding unit in the previously mentioned second form of my invention, and its function is described later. It is sufficient for the present application to point out that these relay chains and relays of the coding unit OCU are arranged as described in the previously mentioned printed art, and employ codes of a selected number of steps. Preferably the codes employ 16 steps, but other code arrangements can be used. With each code consisting of 16 steps, as assumed herein, the first step sent from the office is made long for checking and the following seven steps, three of which are long and four short, are used to form a pattern for station selection. The next seven steps of the control code are of any desired arrangement of short and long elements for control of the station functions and other information that may be sent from the office, and the last step of the code is made long and used to reset the apparatus.

As will appear hereinafter, the indication codes received at the office from the stations consist of a like number of steps, here being also 16 steps. The first step is short for checking and for coordination with control codes. The next seven steps, of which three are long and four short, are used to identify the station sending the indication code, the following seven steps, which may be any arrangement of short and long elements, being used for indicating the functions of the stations, and the last step being made long and used for resetting the apparatus.

The relay chains of coding unit OCU cooperate with the relay OM in control of the transmitting relay OT and operate the relay OT at long and short intervals according to the action of the relay chains of the unit as established by the station selection and the setting of the control levers of the control panel OCP. With the master relay OM picked up closing front contacts 22 and 23, operating circuits for the transmitting relay OT are prepared from the terminals 44 and 45 of the relay chains of the unit, the relay OT being energized when energy is applied to terminal 44 and front contact 22 of relay OM is closed, and the relay OT being shunted and held released in response to a shunt circuit having connection to the terminal 45 when front contact 23 of relay OM and back contact 46 of relay OT are closed. A stick, or third control circuit for relay OT is completed at times over its own front contact 69 from terminal 48 of the coding unit. In other words, the circuit including front contact 22 of relay OM is effective to energize and pick up the transmitting relay OT for a selected time interval determined by the timing relays of the coding unit, and the circuit completed at front contact 23 of relay OM is effective to shunt the relay OT and hold it released for a selected time interval as also determined by the timing relays of the coding unit. The third circuit completed at front contact 69 is effective to retain relay OT picked up for longer intervals as determined by the code settings of panel OCP and the timing relays. With the transmitting relay OT thus picked up or held released for selected time intervals, it correspondingly operates its contact 18, and the oscillator of the transmitter CT is correspondingly keyed so that the control carrier supplied to the line circuit is coded to have corresponding on and off periods.

The master relay OM when released closing back contact 25 is effective to associate the coding unit OCU with the indication receiver IR, the association being completed through the code following relay OC and a relay OR. When the coding unit is thus associated with the indication receiver, it is operated to interpret the indication code received at the office. The relay OR is a two-winding magnetic stick relay. The arrangement of relay OR is such that when current flows in either or both windings in the direction of the arrows, the contacts are operated to the normal, or left-hand positions. When current flows in the windings in the direction opposite the arrows, the contacts are operated to their reverse, or right-hand positions. The lower winding of the relay is energized at either positive or negative polarity according as the code following relay OC is operated to its reverse position closing reverse contact 24 or to its normal position closing normal contact 24, the first circuit path including terminal B of a battery OB, reverse contact 24 of relay OC, back contact 25 of relay OM, a capacitor C1, lower winding of relay OR and center terminal CL of the battery. The second path extends from terminal N of the battery, over normal contact 24 of relay OC, back contact 25 of relay OM, capacitor C1, and lower winding of relay OR to the center terminal CL. Hence the relay OR is made to repeat the operation of the code following relay OC. The top winding of the relay OR is energized by the conventional circuit, controlled by front and back contacts 72 of the transmitting relay OT, from terminals 49 and 50 of the coding unit OCU. In addition it is provided with a circuit including front contact 105 of relay SCP. The function of this auxiliary energizing circuit for the top winding of the relay OR will appear later. The operation to their normal and reverse positions of the contact members 86 and 87 of the relay OR causes positive energy from terminal B of the battery to be applied to the conventional terminals of the coding unit OCU for operating the counting relay chains in the known manner.

It is to be seen from the foregoing description that with the master relay OM at the office released, the coding unit OCU is operatively connected to the indication receiver IR and the indication code applied to the receiver IR is decoded to control a group of indication relays of which only the one relay WK is shown. When the master relay OM is picked up, closing front contacts 15, 22 and 23, in response to operation of the starting button SB of the control panel OCP, the transmitting relay OT is operated at long and short intervals according to the selection of the coding unit as determined by the station code and the control panel levers. The oscillator of the transmitter CT is then keyed so that the control carrier supplied to the line circuit for transmission to the stations is coded at a corresponding group of long and short steps of the carrier current.

Referring to Fig. 2, in which is a diagrammatic view showing the apparatus at a field station 234, the apparatus includes a control receiver CR and an indication transmitter or generator IG. The input of the receiver CR and both the input and output of the generator IG are connected in multiple across the line circuit 1LW—2LW extending between the office and the stations, the connection to the line circuit being completed through filters F4, F5, and F6, respectively. The filters F4, F5, and F6 include elements tuned to pass carrier current of the frequencies *f*1, *f*2, and *f*3, respectively.

The receiver CR is similar in construction to the receiver IR at the office OF, except as to the tuning, and includes a carrier amplifier VT7, a detector VT8, and an amplifier VT9 in cascade. The input of the amplifier VT7 is connected to filter F4 through a load resistor 26, and the output of the amplifier VT9 is connected to one winding of a code following relay FC of the biased type. The parts of the receiver CR are proportioned to detect the codes of the control carrier frequency *f*1 and hence the code following relay FC is operated in correspondence with the code steps of the control carrier received at station 234 from the office OF over the line circuit 1LW—2LW. Since non-coded control carrier is continuously supplied to the line circuit when no codes are being transmitted, relay FC is deenergized and occupies its biased or reverse position when the system is at-rest.

The indication transmitter or generator IG, used when a pilot carrier is employed, is preferably of the construction disclosed in the aforementioned Alexander Finlay Patent No. 2,735,083 and thus includes a pilot receiver PR, a distorting or frequency converter stage BA, a limiter amplifier stage LTS, and a power amplifier stage PAM in cascade. This generator IG is fully explained in the Alexander Finlay patent and it is here described only briefly since its specific structure forms no part of my present invention. The pilot receiver PR is connected to the filter F5 and is responsive to the pilot carrier frequency *f*2 which is constantly supplied to the line circuit by the transmitter PT. The output of the receiver PR is applied to the converter stage BA in such a manner as to cause harmonics of the pilot carrier frequency *f*2. A tank circuit of the converter stage BA selects the second harmonic of the pilot carrier, which is here assumed as a frequency *f*3. In other words, the tank circuit is tuned to resonance, for example, at a frequency double the pilot frequency. This second harmonic is applied to the limiter stage LTS and then to the amplifier stage PAM, and then in turn is supplied to the line circuit through the filter F6. The generating of the indication carrier *f*3 is started and stopped, that is, it is coded, by the opening and closing of the cathode lead circuits of the converter stage BA and of the limiter stage LTS, as will appear shortly. Since the frequency of the indicator generator IG is determined by the pilot carrier supplied to the line circuit, it is clear that the carriers generated at the different stations of the systems are identical.

In those cases where the pilot frequency cannot be used because of lack of spectrum for it, the indication transmitter is of the type described for the control transmitter at the office. The indication transmitter IT shown in Fig. 2*a* thus would be used in place of the indication transmitter IG when no pilot carrier is used. As shown, the transmitter IT includes an oscillator VT10, similar to the oscillator VT1 of the office control transmitter CT except adapted to generate the carrier frequency *f*3. The buffer amplifier VT2 and the transformer T1 are identical in the two transmitters. The output of the indication transmitter IT would be supplied to the line circuit through a filter F6, identical with the similar filter of Fig. 2, and the connections shown dotted in the drawing. For purpose of this description, the transmitter IG will usually be considered as the unit in service at station 234.

The equipment at the station 234 also includes an indicating device ID, a station coding unit SCU, coordinating and checking relays CD1 and CD1P, and a cooperating circuit network. The CD1 and CD1P relays are part of a coordination and check circuit required when the pilot frequency is not used. These relays are in addition to the code disagreement relay CD which is described in the previously listed printed art as being included in the coding unit. It is to be understood that, in the previously described first form of my invention, when the pilot carrier by itself is used to provide coordination, the relays CD1 and CD1P are not used. In such case, the front and back contacts of these relays here shown included in various control circuits hereinafter described would be eliminated from such circuits. Such elimination will be considered at times in the following description.

The station coding unit SCU comprises a master relay FM, a transmitting relay FT, two separation relays, the one a station selection relay S and the other a station sequence relay SS, and the previously mentioned code disagreement relay CD, together with timing and counting relay chains similar to those of the office coding unit OCU, and also similar to that described fully in the previously mentioned printed art. The unit SCU is here shown conventionally only.

The indicating device ID comprises a starting relay means for initiating the sending of an indication code from the station 234 and means for determining the code pattern of the indication carrier. The starting relay FST is normally energized, the relay winding and a reactor 29 in multiple being connected across terminals B and N of the source of current through a normal contact 106 of relay FST and a contact 30 operatively associated with a device AR, movable to a first and a second position. When the remote control system is used for a railroad, the device AR may be a wayside signal mechanism, a switch operating mechanism, or some other similar device, the position of which is governed through the remote control system. It is to be understood of course that the remote control system of my invention is not limited to railroads and this application of the system is cited only by way of illustration.

When contact 30 of the device AR is shifted in its position in response to a movement of the device, the circuit for the starting relay FST is interrupted momentarily and the relay is operated to its right-hand position by the bias of the relay. The energy stored in the reactor 29 creates an electromotive force that causes current to flow in the winding of the relay FST in a direction that aids in operating the relay to its reverse or right-hand position. During the coding action of the unit SCU, the conventional pickup circuit for relay FST is completed at the proper time and the energy applied to the winding of the relay as indicated by the dotted line 70.

When reverse contact 106 of the starting relay is closed, a pickup circuit for master relay FM is completed, this pickup circuit including terminal B, reverse position of contact 106 of relay FST, back contact 68 of relay SS, back contacts 75 and 76 of relays 2L and 1L of the timing group, respectively, the winding of relay FM, and terminal N. After picking up, relay FM is retained energized by a stick circuit that includes its own front contact 32 and the usual circuit path controlled by the coding unit SCU and which is indicated by a dotted line 33. The master relay FM functions in a manner similar to the office master relay OM. In other words, when the relay FM is deenergized the coding unit SCU is associated with the code following relay FC of the control receiver CR to decode and interpret the control code received at the station 234 and to selectively energize a group of control relays of which only the one relay HS is shown. The master relay FM when energized by operation of the indication device ID as explained above is effective to associate the relay chains of the coding unit SCU with the transmitting relay FT. Relay FT in turn is operated to key the indication transmitter IG so that the indication carrier supplied by this station to the line circuit is coded according to the operation of the relay FT.

To be more specific, when the master relay FM is deenergized, current pulses supplied from the amplifier VT9 to the top winding 71 of the relay FC, or to both windings in series in the first form of my invention, cause the relay to operate its contacts 52 and 64 between normal and reverse positions. This supplies pulses of direct current, over the conventional terminals 93, 94, 95 and 96 of the coding unit, to the usual circuits, not shown, of the relay chains so that the code operation of the relay FC is registered and a group of station and function control relays selectively energized. This operation of the unit is fully explained in the aforementioned printed art and the registering circuits are not part of my invention. When the master relay FM is picked up closing front contacts 27 and 28, circuit paths are provided by which the transmitting relay FT can be picked up or held released for intervals determined by the operation of the relay chains of the coding unit, these circuits for relay FT being the conventional circuits.

Operation of the transmitting relay FT serves to code the indication transmitter IG by opening and closing the cathode lead portion of the anode circuit of the converter stage BA and of the limiter stage LTS. These two anode circuits are connected to terminal 25OB of the power source in multiple. The cathode leads of these circuits, in multiple, are connected to terminal 25ON of the source through the circuit over wire 35, front contact 36 of relay FM, back contact 37 of relay CD1, front contact 38 of relay FT, and wire 39 to terminal 25ON. If the first form of my invention is used, so that the relays CD1 and CD1P are not provided, this circuit would include only wire 35, front contacts 36 and 38 of relays FM and FT, respectively, and wire 39. Also in this first form, the first of the two circuit paths described in the following paragraph does not exist, and the second is not provided, or required.

When the second form of my invention is used, or the combination of the two forms as shown in Fig. 2, two additional circuits are provided by which the indication transmitter may be keyed. The first of these additional circuit paths may be traced as before from the two anode circuits connected in multiple to terminal 25OB over wire 35 and front contact 36 of relay FM thence over front contacts 37 and 40 of relays CD1 and S, respectively, to wire 39 and terminal 25ON. The other path extends from wire 35 over back contact 36 of relay FM and the above-mentioned front contact 40 of relay S to wire 39.

Thus, as shown in Fig. 2, the indication transmitter or generator IG is keyed by the operation of relay FT to open and close its front contact 36 when relay FM is picked up and relay CD1 released, that is, the station coding unit is in the transmitting condition and, as will be described shortly, no code interference exists. This action results in a coded indication carrier of the frequency $f3$ being supplied to the line. When the coding unit is in the receiving condition with relay FM released, the generator is also made active when the station relay S picks up to complete the second additional keying circuit described above. The use for this indication carrier pulse during a control code will appear later. If relay CD1 picks up while the station is transmitting, the generator IG is again made active to transmit indication carrier when the relay S picks up, in a manner to be described later, to close the first of the previously described additional keying circuits.

However, if only the first form of the invention is used, the indication transmitter IG is keyed to transmit carrier only when the coding unit is in the transmitting condition, with relay FM picked up, and the relay FT is operated in the conventional manner by the relay chains. If no pilot carrier is being used, so that the indication transmitter IT of Fig. 2*a* is substituted for the transmitter IG, the oscillator VT10 is keyed over any one of the three circuits, in a manner similar to the keying of the oscillator VT1 of the control transmitter CT. In other words, the cathode lead of the oscillator VT10 is connected directly to terminal 25ON, while the anode circuit is connected to wire 35, and thence to terminal 25OB at wire 39 over any one of the three keying circuits previously described for the generator IG.

As set forth hereinbefore, the apparatus embodying my invention includes means for the coordination of control and indication codes and the coordination of simultaneous indication codes using a single control carrier and a different single indication carrier with the frequency of the indication carrier being common to a multiplicity of field stations.

In the first form, my invention describes a pilot frequency $f2$ which is received at all field stations and used to insure that the frequency and the phase relationship of the indication frequency $f3$ placed on the transmitting medium by the various field stations will be such as to insure that carrier from one station will not have a cancellation effect on the same carrier frequency from another station. This insures that a retransmitted control carrier from the office, as described hereinbefore, will be placed on the transmitting medium even though more than one field station is attempting to transmit. This retransmitted step from the office, by operating the FC relay at each station, provides a means for the coordination mentioned earlier in this description.

When one field station indicates, each retransmitted code step performs two functions. It causes operation of the FC relay at the station transmitting to allow that station to progress with its code, and it results in the operation of the FC relay at all other field stations, thereby setting their timing chain relays so that the coding units at these stations are held inactive as transmitters. These actions are similar to that described in the aforementioned printed art. When two field stations attempt to transmit to the office simultaneously, the retransmitted code steps perform a third function, namely, the establishment of disagreement between the FC relay position and the FT relay position at the less preferential stations. This disagreement is used to delay further transmission by the less preferential stations as described in the aforementioned printed art. Similarly, simultaneous control and indication codes are coordinated, the long first step of the control code making the office coding unit the preferential station.

When practical considerations make the use of a pilot frequency difficult, or if further step-by-step checks against transmission interference when using the pilot carrier are desired, then the additional coordinating relays and their circuit networks are made part of my invention.

As mentioned previously, without a pilot frequency, the independent indication transmitters at the field stations can readily place alternating currents on the transmission medium that will cancel each other and distort the code received at the control office. Thus, it becomes impossible to coordinate, by the usual code disagreement method previously described, the sending of indication codes simultaneously by two or more stations. Therefore, to provide such coordination, the apparatus at the station 234 includes the relays CD1 and CD1P and appropriate circuits, including contacts of these relays and also contacts of relays S and SS of the coding unit. Furthermore, the two windings of the code following relay FC are independently energized, the top winding 71 being energized by the output of the receiver CR in response to the control carrier code received from the office over the line circuit and the lower winding 97 of the relay being energized by a local circuit network. It is believed that this additional equipment for coordinating and checking the control and indication codes can best be explained by a description of the operation of the apparatus.

It is to be noted that the apparatus at station 234 of Fig. 2 is duplicated at each of the other stations of the system except as to the code setting of the coding unit. That is to say, the system may include two stations or a relatively large number of stations, each of which is provided with apparatus substantially the same as that shown in Fig. 2. It is unnecessary to describe the apparatus of these other stations because of this duplication in the field station equipment, the equipment for a second station 235 being shown conventionally.

Normally, that is, when no control code is being sent from the office and no station is sending an indication code to the office, the control transmitter CT is active to supply noncoded control carrier to the line circuit. This noncoded control carrier is supplied to the receiver CR at each station and is effective to create a negative bias on the amplifier VT9 so that the current supplied to the top winding 71 of the corresponding code following relay FC is reduced and the relay contacts are operated to their reverse or right-hand position by the bias of the relay, the lower winding 97 of the relay being deenergized at this time. The pilot transmitter PT is active in the arrangement shown, and the pilot receiver PR at each station is energized. The indication transmitter IG at each station is deenergized due to the anode circuits being normally open in the cathode lead portion of the circuits, these circuits being held open at front contact 36 of the master relay FM, and front contacts 37 and 40 of relays CD1 and S, respectively, of each station apparatus.

However, for purposes of the following discussion, in order that the necessity and importance of the relays CD1 and CD1P may be shown, I shall assume that no pilot carrier is used. Since it is assumed that no pilot carrier is being used, it may also be considered that indication transmitter IT of Fig. 2*a* is in use. In this case, the anode circuit of the oscillator VT10 is disconnected from terminal 25OB, the three keying paths being held open as described, and the transmitter IT is similarly deenergized. Control receiver CR at each station and the indication receiver IR at the office are energized and ready to receive. Furthermore, the starting relay FST and the repeater relay CD1P at the field station 234 and the corresponding relays at each of the other stations are normally energized.

Should the operator at the office OF desire to operate the device AR at station 234, he sets lever ARL on his control panel OCP at the position to which he desires the device AR to be operated and then presses the starting button SB. This results in the master relay OM being picked up and then retained energized until the code is transmitted. With the master relay OM picked up, the transmitting relay OT is operated according to the code operation of the relay chains of the coding unit as determined by the station selection and the position of the control lever ARL. This operation of the transmitting relay OT keys the transmitter CT so that the control current supplied to the line circuit is of a corresponding code pattern. This coded carrier is received at station 234 and at each of the other stations and the code following relay FC at each station is correspondingly operated. At the desired station 234, the coding unit SCU responds to this code operation of the code following relay FC and the relay HS of the control relay group is selectively energized. Relay HS picks up, closing front contact 99 to complete an operating circuit for the device AR. At each of the other stations, the operation of the code following relay FC provides no useful function because the associated coding unit does not respond to the station selection portion of this code.

At the end of the operation of the device AR, its contact 30 is operated causing the operation of the starting relay FST. Master relay FM at this station is then picked up so that the transmitting relay FT is operated to key the indication generator IG, or the transmitter IT, and cause indication carrier to be supplied to the line circuit. The coded indication carrier thus supplied to the line circuit is transmitted to the office where it is detected by the receiver IR and the code following relay OC correspondingly operated.

Operation of the office code following relay OC does two things. In the first place, the operation of contact 24 of the relay OC causes the magnetic stick relay OR to repeat the operation of relay OC. Contacts 86 and 87 of relay OR are thus operated to supply pulses of direct current to the conventional terminals and circuit network of the unit OCU, which when operated in response to an indication code selectively energizes the indication relay WK whereby indication light NL on the control panel OCP is illuminated to indicate to the operator that the device AR has operated.

In the second place, the operation of contact 13 of the office code following relay OC serves to key the transmitter CT and the indication code is retransmitted from the office on the control carrier. This retransmitted code is received step-by-step at station 234 and at each of the other stations and the station code following relays FC are correspondingly operated. Thus at station 234, the relay FC is operated in correspondence with the keying of the indication transmitter at that station through the medium of the line circuit and the control carrier.

When the transmitting relay FT at station 234 is operated to key the indication transmitter and thereby provide the coded indication carrier, a circuit is also established to check against interference in the sending of the indication code. This circuit involves the check relays CD1 and CD1P and the relays S and SS of the coding unit. The relay CD1P is a slow release repeater relay for the relay CD1 normally energized by a simple pickup circuit including back contact 63 of the relay CD1. Relay CD1P is provided with a slow release period by a capacitor 73 connected across the winding of the relay. With the transmitting relay FT picked up closing front contact 38 to key the indication transmitter and the relay FC operated to its normal position closing contact 52 due to the retransmitted code step from the office, the path from terminal B through normal contact 52 of relay FC, an asymmetric unit 53 in its low resistance direction, front contact 54 of relay CD1P, back contact 55 of the relay CD1, and resistor 59 to terminal N serves to shunt the winding of the relay CD1. Relay CD1 thus remains released even though its pickup circuit from terminal B over back contact 56 of relay S, front contact 57 of relay FT, front contact 58 of relay CD1P, through the winding of relay CD1 and resistor 59 to terminal N is also closed. That is to say, if the shunt path and the energizing path for relay CD1 are completed each time relay FT picks up, the relay CD1 does not pick up with the result that the sending of the indication code from the station 234 progresses until it is completed. Thus, under normal operation of the apparatus, the retransmitting of the indication code on the control carrier correspondingly operates the station relay FC which advances the station coding unit SCU so that its relay FT is operated and the sending of the indication code continues until the code is completed. The circuits over terminals 93, 94, 95 and 96 for advancing the operation of the unit SCU and the manner of operation are as outlined in the aforementioned printed art.

If because of some interference the relay FC at station 234 is not operated to close normal contact 52 during the sending of the first indication code pulse from that station, or any other odd-numbered code step, the relay CD1 is energized by the previously traced circuit including front contact 57 of the relay FT. The picking up of the relay CD1 to open back contact 37 opens the circuit by which the indication transmitter is being keyed and thereby the sending of the indication code from station 234 is suppressed. The relay CD1 is retained energized by a stick circuit including its own front contact 61 and either front contact 78 of relay LBP or front contact 62 of relay FM. Also, because of the opening of its back contact 55, relays CD1 cannot now be shunted by any further operation of the relay FC due to any interference or other fault conditions.

If the interference is due to the office initiating the sending of a control code at the same time as one or more stations, including 234, the long first pulse of the control code holds the FC relay at station 234 in its normal or left-hand position for the long interval whereas the first indication code pulse is short, as determined by the release of relay FT. With reverse contact 52 of relay FC open for a long interval, energy is removed from terminal 94 for a sufficient time to allow relay 1L to release in the conventional manner. This causes the code disagreement relay CD in the coding unit SCU to pick up to deenergize relay FM, also in the conventional manner. Release of relay FM changes the unit SCU from a transmitter to a receiver, causing the indication code to be stored and allowing the control code to complete to whichever station is selected.

If the interference is caused by one or more other stations attempting to send an indication code at the same time that station 234 is sending an indication code, the relay CD1 at each of these other stations as well as at the station 234 is picked up in the manner explained for the energizing of relay CD1 at station 234. That is, if the alternating currents from more than one station cancel each other, it is reflected through the presence of control carrier to deenergize each relay FC, which operates to its reverse position, thereby removing the shunt on relay CD1. With relay FT energized, the pickup circuit for relay CD1 is established without the shunt and relay CD1 picks up at each station in the transmitting condition. This results in the suppression of the sending of the indication codes from all of the stations involved. With the sending of the indication codes from all of these stations suppressed it becomes a matter of determining which station will be permitted to send its indication code first and the order in which the stations can send their codes one at a time. That is to say, it becomes a matter of separating the stations so that they may send their indication codes one at a time without interference.

This separating operation will now be described. When the interference takes place and the sending of the indication codes suppressed, the transmitting relay FT at each station involved is picked up but the code following relay FC is not operated, in response to a retransmitted code step, to advance the action of the relay chains of the coding unit SCU of the station in the conventional manner. Consequently the relay FT of the station remains energized, over its conventional stick circuit which is herein indicated by a dotted line 60, awaiting the operation of the relay chains of the coding unit. The energizing and picking up of the relay CD1 of each station attempting to send an indication code causes the corresponding repeater relay CD1P to be deenergized and shortly release. When relay CD1P is released it completes a circuit for energizing the lower winding 97 of relay FC at the same station, the circuit including terminal B, back contact 74 of relay S, front contact 31 of the transmitting relay FT, back contact 51 of relay CD1P, the lower winding 97 of the relay FC, and terminal N. Thus each code following relay FC is immediately operated to its normal position by the local energy applied to the lower winding 97 of the relay.

This local operation of each relay FC causes each corresponding coding unit SCU to advance and thereby operate the relay FT. The corresponding operation of front contact 31 to open and close in turn causes local operation of each relay FC until one of the S relays is picked up on its selected code step in response to the conventional operation of its coding unit supplying current to the circuit indicated at 82. Assuming that the S relay for the station 234 is operated first due to the code pattern for station 234, that is, it is operated ahead of the S relay of any of the other stations attempting to send an indication code, because its station numbers are of lower order and are readied ahead of the others, energy is removed from the lower winding 97 of its relay FC and that relay is operated to its reverse position by its bias. This operation of the relay S at station 234 also removes the suppression of the keying of the indication transmitter and its anode circuit is closed through front contacts 36, 37 and 40 of relays FM, CD1 and S, respectively. This action at the station 234 results in the sending of indication carrier and the removal of control carrier from the line circuit due to the reversal of office relay OC. Thus relay FC at station 234 is now operated to its normal position by energy supplied to top winding 71 due to the retransmitted code step. Since the S relay at station 234 is stuck energized over front contact 80 of the relay LBP of the timing relay chains of the associated coding unit, the indication carrier $f3$ is on the line circuit until the end of the release period of the relay LBP of the timing chain plus the release period of relay S of station 234. Because of the presence of indication carrier on the line circuit, and the removal of control carrier from the line circuit, all of the station coding units involved in the interference are locked with the corresponding code following relay FC in the normal position. Consequently each station and the office equipment is locked out from functioning as a transmitter.

Recognition of the first station to operate its S relay and enable it to restart the sending of its indication code is made by the above operation of the FC relays in step with the sending of the indication carrier from station 234, that is, the station first to pick up its S relay. With the FC relay at each of the other stations held at its normal position before the S relay at that station is picked up, the associated relays FM and CD1 are released due to the operation of the timing relays of the coding unit, the relay CD1 at each station being released, by the opening of front contact 78 of relay LBP, after the release of relay FM. With relay CD1 released and before the relay CD1P, which is made slightly slow in pick up by the resistor-capacitor arrangement in its circuit, has had time to pick up, the associated relay SS is picked up by current flowing from terminal B through normal contact 64 of relay FC, back contact 65 of relay S, back contact 66 of relay CD1, back contact 67 of relay CD1P, and the winding of relay SS to terminal N.

This circuit for relay SS is provided in addition to its conventional pickup circuit controlled by the relay MSP associated with the coding unit, this conventional pickup circuit here also including front contact 67 of relay CD1P. The relay SS is then retained picked up by a stick circuit including its own front contact 79 and the conventional circuit of the coding unit indicated by a dotted line 81. With the relay SS picked up opening back contact 68, the circuit for the corresponding master relay FM is held open and that station is held in its receiving condition and its indication stored.

Since we have assumed that the S relay of station 234 of Fig. 2 was picked up in the separation operation, the associated relay SS of station 234 was not energized because its pickup circuit network is held open at the back contact 65 of relay S. The result of this action is that after the SS relays have locked out the other stations, only the field station 234 is prepared to transmit immediately, because with its relay SS released, it is prepared to have its master relay FM picked up and its apparatus operated to send its indication code. It follows from the foregoing that the interference that stopped the sending of the indication codes is removed as far as station 234 is concerned and it immediately proceeds to send its indication code.

At each of the other stations involved in the interference at which the S relay was not picked up so that the SS relay picked up to hold the station from transmitting an indication code, the following operation takes place. The relay SS is retained picked up by its conventional stick circuit, previously described. This stick circuit remains closed for a time interval, determined by the timing relay chain of the unit, which is sufficient to enable station 234 to start and complete the sending of its indication code. When the relay SS at each of these stations is released subsequent to the sending of indication code from station 234, each station is then able to initiate the sending of its stored code. Should interference still persist, again disagreement occurs, transmitters at each station are suppressed, and again local energy is supplied to the lower winding 97 of the corresponding relay FC. Thus the units of these stations are advanced by local operation of the FC relay until another S relay at one of the stations involved is selected. The selection of an S relay at one of the remaining stations awaiting the sending of the indication code makes that station the preference station over the other stations in the same manner that the station 234 was first made a preference station. This new preference station proceeds to send an indication code in the same manner described in connection with station 234. Consequently, this separation operation is repeated until all the stations involved in the interference and having stored indications have sent an indication code to the office.

The foregoing description of the operation of separating two or more stations attempting to send indication codes at the same time assumes that during the separating operations no other station or the office attempts to send a code. However, after the separation operation starts and before an S relay at one of the stations being separated is selected, it is possible for the office or another station outside the interference group to start a code because the line condition is now normal to the office and the other stations. Initiation of this new code operates all the station code following relays FC to their normal position due to the current supplied to the top winding of these relays by the corresponding receiver because the control carrier is suppressed.

If, under these circumstances, another station or the office starts sending a code before the repeater relay CD1P releases at stations undergoing the separation process, the relay LBP of the timing chain of the unit SCU is picked up and causes the relay CD1P to be held up by a stick circuit which includes front contact 85 of relay LBP and its own front contact 84. In this case the local coding circuits are made ineffective because back contact 51 of relay CD1P remains open, and the timing relay group of the coding unit is allowed to operate in the conventional manner in response to the code operation of the corresponding FC relay by the control carrier. To insure this action if the new code starts in time after relay CD1 picks up, the release time of relay CD1P is made sufficient to permit the relay LBP to be picked up to complete the stick circuit. This results in the apparatus at the stations involved in the separation being eliminated as transmitters and held ready to receive. If the outside or new code is an indication code, it will be completed without interference from a station that is involved in the separation process because at that station relay CD1 and CD1P are picked up, suppressing the indication transmitter and preventing local coding. If the outside or new code is a control code from the office, the equipment at each of the stations involved in the separation process, since the CD1P relays are still energized, is ready to receive the control code, and the control code may be allowed to complete in the usual manner.

If the relay CD1P has been released and the local coding circuits established when a code from a new point outside of the interference group starts, one of the following operations takes place, depending upon whether the new code is an indication or control code. Since selection of an S relay at one of the stations in the process of separation causes steady indication carrier to be placed on the line circuit, any station initiating an indication code after selection of an S relay will become part of the interference pattern and will be handled in its correct order.

If no S relay has been selected, and with local coding action occurring at each of the interfering stations, operation of the FC relays at these stations by the retransmitted code from the office, due to the new indication code operating the OC relay, will eventually result in the energization of the CD relay, in the conventional manner, when the FT relay, controlled by local coding action, releases with relay FC held normal by a retransmitted code step. With the CD relay at a station picked up, and that station eliminated as a transmitter, continued operation of the FC relay by the retransmitted code might result in the incorrect registry of the code steps as function controls at that station. To prevent this, the FC relay at each station involved in the separation process is held normal, after the CD relay picks up, by energy supplied from terminal B over front contact 77 of relay CD, and back contact 51 of relay CD1P through the lower winding 97 of relay FC to terminal N. Therefore, if the new code initiated after the CD1P relays at the interfering stations have released, and before an S relay is energized, is an indication code, it may be allowed to continue and complete in the usual manner. The separation action then will begin again.

If, however, the new code is a control code, a check must be provided to determine if it is being transmitted to a station in the process of separation at which the CD1P relay has released. This is necessary to prevent the loss of a control code, since the FC relay at such a station is locked in its normal position, as previously described, and the control code cannot be received. Of course, if the control code is intended for a station outside the interference group, or if the CD1P relay at the separating station is not yet released, the control code may be allowed to complete. Also, if an S relay has already been selected at one of the interfering stations, the office is locked out by the OC relay being held reverse by the steady indication carrier, and no office coding action can begin.

Referring to Fig. 1, this check of the proper receipt of a control code is accomplished by the use at the office of a lockout relay, a repeater of the S and OC relays at the office, the relay SCP, which is part of my invention. If the station to which the control code is transmitted receives the code so that its S relay is selected, indication carrier is received at the office to operate the relay OC to its reverse position. Opening of normal contacts of this relay removes battery from the pickup circuit of relay SCP and the code is allowed to continue. If no S relay is selected at a field station, relay OC remains normal and when relay SP picks up on the same step as should select a field S relay, energy is supplied to pick up relay SCP. This locks the relay OR reverse and causes the office coding unit to reset.

Specifically, if the office is transmitting a control code to station 234 of Fig. 2, the 234S and SP relays in the office coding unit OCU will pick up in sequence during the fourth step of the code. If conditions are normal, that is, no interference exists, so that the field station coding unit SCU is following the code step-by-step, its relay S will also pick up during the fourth step. This occurs slightly ahead of the pick-up of office relay 234S. The selection of the S relay in the field unit activates the indication transmitter by closing the previously described keying circuit over back contact 36 of relay FM and front contact 40 of relay S. This indication carrier is received at the office so that relay operates to its reverse position at the same time relay SP picks up. The opening of normal contact 100 of relay OC removes battery from the pickup circuit of relay SCP, which circuit includes front contact 101 of relay SP and front contact 102 of relay OM. That is, the answer by the field station prevents relay SCP from being energized which in turn allows the control code to progress to completion.

If the field station is in the process of separation and its CD1P relay has released, then the station is locked out by the control code, that is, the relay FC is held normal when the relay CD picks up, and its S relay and none of the other S relays will be selected. Since no indication carrier is then received, relay OC remains in its normal position when relay SP is energized. This results in energization of relay SCP through the circuit from terminal B over normal contact 100 of relay OC, front contact 101 of relay SP, front contact 102 of relay OM, and the winding of relay SCP to terminal N. Closing of front contact 105 of relay SCP energizes relay OR, which operates to its reverse position, since the current flow is opposite the arrow. This locks the office unit from further coding. At the same time, opening of back contact 17 of relay SCP deactivates the control carrier locking all field stations in corresponding condition, that is, all FC relays held normal. The office coding unit and all station coding units now reset under line reverse conditions. The relay SCP is retained in its picked-up position by a stick circuit including its own front contact 103 and front contact 104 of relay LBP, so that it releases after the reset action is complete. This insures that all station coding units as well as the office coding unit are reset before noncoded control carrier is returned to the line. This occurs upon the release of relay OM, which is also held energized until relay LBP releases. Release of relay OM closes its back contact 15, thus completing the other keying circuit for the oscillator VT1. The office and station coding units again reset, now under line normal conditions, and the system is ready for the transmission of codes. The office, having priority, sends its stored control code, all station units being conditioned to receive the code.

It is to be noted that, during a control code, the SCP relay will also cause lock out of the unit OCU should a pulse of indication carrier or a line disturbance cause relay OC to be operated to its reverse position with the SP relay still in its deenergized position. In this case, relay SCP is energized by the circuit from terminal B over reverse contact 100 of relay OC, back contact 101 of relay SP, front contact 102 of relay OM, and the winding of relay SCP to terminal N. Again, the office and all station coding units are forced to reset and start the coding over again. A similar action occurs should a line disturbance, such as a momentary short circuit, blank out the indication carrier received at the office, after a station S relay is selected, thus causing the relay OC to return to its normal position while the relay SP is picked up. It will be noted that, because of front contact 102 of relay OM, relay SCP can only be energized during control codes. This checking action assures that the transmission of a control code cannot be completed by the office coding unit unless it is being received by the station for which intended. In other words, no control code can be lost.

The net result of the apparatus here provided is an all-carrier remote control system in which control codes are given preference, field station preference is effected, and interference between the field stations and the office is avoided. In the one possible case of code interference between two or more stations initiating the transmission of an indication code simultaneously, the stations are automatically separated so that only one station at a time will send its indication code. This separation is effected in such a manner that no control code or indication code can be lost. In one form of the invention, by the use of a pilot carrier to assure synchronization between several sources of alternating current of the indication carrier, the office unit can answer or retransmit to the field stations during indication codes and the conventional coordination and lockout circuits can be used to prevent interference between stations and between office and stations. When the pilot carrier cannot be used and mutual carrier cancellation exists with one indication frequency, or when, with the pilot carrier, further checks against line interference are needed, a second form of my invention which provides relay checking circuits to provide coordination is used. Either form, or a combination of both forms, provides efficient and satisfactory operation.

Although I have herein shown and described but one form of coded carrier remote control systems embodying my invention, it is understood that various changes and modifications may be made therein within the scope of the appended claims without departing from the spirit and scope of my invention.

Having thus described my invention, what I claim is:

1. In combination, at a station having a device provided with a remote movable contact, an indication transmitter including a generator operable to supply an indication current, a coding unit including a transmitting relay and means to operate the relay at a predetermined time code pattern when the unit is energized, circuit means including said movable contact connected to said coding unit and effective to energize the unit in response to movement of said contact, another circuit means including a contact of said transmitting relay connected to said indication transmitter and operative to start and stop said generator whereby the transmitter supplies indication current having said time code pattern, a normally deenergized check relay having a back contact interposed in said other circuit means to render said transmitting relay ineffective to start and stop said generator when said check relay is energized, means including a code following relay receiving energy in response to the coded indication current supplied by said indication transmitter, said code following relay normally operating to follow exactly said time code pattern, a shunting circuit path connected across the winding of said check relay and including a contact of said code following relay, an energizing circuit connected across said winding of said check relay and including a current source and a front contact of said transmitting relay whereby said check relay is energized and the supplying of the indication current stopped when said code following relay and said transmitting relay are operated out of correspondence.

2. In a system for control of an indicator at an office in accordance with the position of a movable device located at a field station and controlled by receiving means including a code following relay operable in step with time codes of a control current of a first frequency when supplied to said receiving means; transmitting means at the station including a contact operatively connected to said device, a coding unit, a generator of indication current of a second frequency and a circuit network which connects said contact to said unit and the unit to said generator; said coding unit being operative to key the generator according to a selected time code pattern in response to movement of said contact whereby the transmitting means transmits indication current of said selected time code pattern; an office receiving means receiving the indication current transmitted from said station and including a detector responsive to current of said second frequency, a code following relay connected to the detector, and a decoding unit having connection to the code following relay and to said office indicator; said decoding unit being effective to energize said indicator in response to operation of the office code following relay at said selected time code pattern, retransmitting means at the office including a contact of the code following relay and a generator of current of said first frequency and operative to transmit to the station current of said first frequency simultaneously coded to agree with the time code of indication current received at the office, and checking relay means at the station including a contact of the station code following relay having connection to said station coding unit and effective to render the coding unit operative to key said indication current generator only when the station code following relay is operated in exact correspondence with the transmitted time code of the indication current.

3. In a system for control of an indicator at an office in accordance with the position of a movable device located at a field station and controlled by receiving means including a code following relay operable in step with codes of a control current of a first frequency when supplied to said receiving means; transmitting means at the station including a contact operatively connected to said device, a coding unit, a generator of indication current of a second frequency and a circuit network which connects said contact to said unit and the unit to said generator; said coding unit being operative to key the generator according to a selected time code pattern in response to movement of said contact whereby the transmitting means transmits indication current of said selected time code pattern; an office receiving means receiving the indication current transmitted from said station and including a detector responsive to current of said second frequency, a code following relay connected to the detector, and a decoding unit having connection to the code following relay and to said office indicator; said decoding unit being effective to energize said indicator in response to operation of the office code following relay at said selected time code pattern, retransmitting means at the office including a contact of the code following relay and a generator of current of said first frequency and operative to transmit to the station current of said first frequency coded in simultaneous agreement with the time code of indication current received at the office, and checking means at the station including a contact of the station code following relay and having connection to the station transmitting means to render the indication current generator operative to supply current only when the coded operation of the station code following relay is identical with the time code operation of the station coding unit.

4. In a system for control of an indicator at an office in accordance with the position of a device at a field station when the device is controlled to different positions by codes of a current of a first frequency transmitted from an office transmitting means to a station receiving means through a given channel; the office transmitting means including a control lever, a coding unit and a current generator of a first frequency with the coding unit effective to start and stop the generator according to a selected time code pattern determined by the position of the control lever, and the station receiving means including a detector responsive to current of said first frequency, a code following relay connected to the detector and operable in step with the time code pattern of the current and a decoding means controlled by said relay and having connection to the device, said decoding means being operable to control the device according to the code operation of the code following relay, the combination comprising; station transmitting means coupled to said channel and including a contact operatively connected to said device, a coding unit and a generator of current of a second frequency; said station coding unit effective to start and stop the station generator according to an indication time code pattern determined by the position of said contact; office receiving means coupled to said channel and including a detector responsive to current of said second frequency, a code following relay operable in step with the time code pattern of that current and a decoding means connected to the code following relay and to said indicator; said office decoding means being effective to energize the indicator in response to operation of the code following relay at said indication time code pattern, retransmitting means at the office including a contact of the office code following relay and having connection to the office transmitting means to simultaneously start and stop said office generator in step with the received indication time code pattern, and checking means at the station including a contact of the station code following relay and having connection to the station coding unit to render that coding unit operative to start and stop the station generator only when the code operation of the station code following relay is identical with the time code operation of the station coding unit.

5. In a system for control of an indicator at an office in accordance with the position of a device at a field station when the device is controlled to different positions by codes of a current of a first frequency transmitted from an office transmitting means to a station receiving means through a given channel; the office transmitting means including a control lever, a coding unit and a current generator of a first frequency with the coding unit effective to start and stop the generator according to a selected time code pattern determined by the position of the control lever, and the station receiving means including a detector responsive to current of said first frequency, a code following relay connected to the detector and operable in step with the time code pattern of the current and a decoding means controlled by said relay and having connection to the device and operable to control the device according to the time code operation of the code following relay, the combination comprising; station transmitting means coupled to said channel and including a contact operatively connected to said device, a coding unit and a generator of current of a second frequency; said station coding unit effective to start and stop the station generator according to an indication time code pattern determined by the position of said contact; office receiving means coupled to said channel and including a detector responsive to current of said second frequency, a code following relay operable in step with the time code pattern of that current and a decoding means connected to the code following relay and to said indicator; said office decoding means being effective to energize the indicator in response to operation of the code following relay at said indication time code pattern, retransmitting means at the office including a contact of the office code following relay and having connection to the office transmitting means to simultaneously start and stop said office generator in step with the received indication time code pattern, and checking circuit means at the station including a contact of the station code following relay and a contact of the station coding unit to enable the station coding unit to start and stop the station generator only when the code operation of these two last mentioned contacts exactly corresponds.

6. In a system for control of an indicator at an office in accordance with the position of a device at a field station when the device is controlled to different positions by codes of a current of a first frequency transmitted from an office transmitting means to a station receiving means through a given channel; the office transmitting means including a control lever, a coding unit and a current generator of a first frequency with the coding unit effective to start and stop the generator according to a selected time code pattern determined by the position of the control lever, and the station receiving means including a detector responsive to current of said first frequency, a code following relay connected to the detector and operable in step with the time code pattern of the current and a decoding means controlled by said relay and having connection to the device and operable to control the device according to the code operation of the code following relay, the combination comprising; station transmitting means coupled to said channel and including a contact operatively connected to said device, a coding unit and a generator of current of a second frequency; said station coding unit effective to start and stop the station generator according to an indication time code pattern determined by the position of said contact; office receiving means coupled to said channel and including a detector responsive to current of said second frequency, a code following relay operable in step with the time code pattern of that current and a decoding means connected to the code following relay and to said indicator; said office decoding means being effective to energize the indicator in response to operation of the code following relay at said indication time code pattern, retransmitting means at the office including a contact of the office code following relay and having connection to the office transmitting means to simultaneously start and stop said office generator in step with the received indication time code pattern, a check relay at said station, an energizing circuit means including a contact of the station code following relay and a contact of said station coding unit connected to said check relay and effective to energize that relay only when the last two mentioned contacts are positioned out of agreement during an indication code, and means including a contact of said check relay to govern the starting and stopping of said indication generator by the station coding unit.

7. In a system for indicating at an office the position of a device located at a station when the device is controlled to said position by a selected code of a control current of a first frequency transmitted from the office to the station, a control receiver at the station including a detector responsive to current of said first frequency, a code following relay having a first and a second winding and operable when current pulses are supplied to either winding, said first winding being connected to said receiver for operation of the relay in response to codes of the control current, a coding unit at the station including timing and counting relay chains operable in a step-by-step manner with code pulses supplied thereto, a master relay, a transmitting relay, a check relay, a generator adapted to supply indication current of a second frequency, circuit means including a contact of the code following relay connected to said coding unit to supply pulses to the unit in response to operation of the code following relay, means including a contact closed at said positioning of the device to energize said master relay, another circuit means including a front contact of the master relay and contacts of said unit having connection to the transmitting relay to operate the transmitting relay according to the operation of the unit, a keying circuit including a front contact of said transmitting relay and a back contact of said check relay connected to said generator to code the indication current according to code operation of the unit, office receiving and retransmitting means adapted to receive said coded indication current and retransmit the code on said control current for operation of the station code following relay, means including a contact of the code following relay and a front contact of the transmitting relay connected to said check relay and effective to energize the check relay and stop the keying of said generator when the code following relay and the transmitting relay are operated out of correspondence; and other circuit means including a contact closed when the check relay is energized, a normally closed contact of the unit and a front contact of the transmitting relay connected to said second winding of the code following relay for local operation of that relay to thereby advance the operation of said unit with the keying circuit ineffective.

8. In a system for indicating at an office the position of a device located at a station when the device is controlled to said position by a selected code of a control current of a first frequency transmitted from the office to the station, a control receiver at the station including a detector responsive to current of said first frequency, a code following relay having a first and a second winding and operable when current pulses are supplied to either winding, said first winding being connected to said receiver for operation of the relay in response to codes of the control current, a coding unit at the station including timing and counting relay chains operable in a step-by-step manner with code pulses supplied thereto, said unit having a normally deenergized station relay, said station provided with a master relay, a transmitting relay, a check relay and a generator adapted to supply indication current of a second frequency, a first circuit means including a contact of said code following relay connected to said unit to supply current pulses to the unit in response to operation of the code following relay, means including a contact operated by said device to energize the master relay, a second circuit means including a front contact of the master relay and contacts of said unit connected to said transmitting relay to operate the transmitting relay according to the stepping operation of the unit, a keying circuit including a back contact of said check relay and a front contact of said transmitting relay connected to said generator to code the indication current according to the code operation of the unit, office receiving and retransmitting means adapted to receive said coded indication current and retransmit the code on said control current for operation of said code following relay, a third circuit means including a contact of the code following relay and a contact of said transmitting relay connected to said check relay and effective to energize the check relay to stop the keying of said generator when the code following relay and the transmitting relay are operated out of correspondence, a fourth circuit means including a contact closed when the check relay is energized, a front contact of said transmitting relay and a back contact of said station relay connected to said second winding of the code following relay for local operation of the code following relay to advance the operation of the coding unit until its station relay is energized, and another circuit means including contacts operated when said station relay is energized having connection to said check relay to restore the check relay to its normal deenergized position and reestablish the keying circuit of said generator.

9. In a system for indicating the position of a plurality of devices one at each of a plurality of spaced stations by use of indication carriers of the same frequency transmitted over a common transmitting channel, a generator at each said station coupled to said channel and adapted to supply said carrier when energized, a coding unit at each said station including relay chains operable at a code pattern individual for the unit and having a transmitting relay which is operated in step with the individual code pattern of the unit, starting means at each said station including a contact operatively connected to the station device and having connection to the station coding unit to initiate an operation of the unit, keying means at each station connected to the station generator and including a contact of the station transmitting relay to start and stop the generator of the station coding unit, receiving means at each said station coupled to said channel and including a carrier detector and a code following relay, each said receiving means responsive to a control carrier of a frequency different from the indication carrier frequency, means coupled to said channel having means operable to supply a pulse of said control carrier to the channel in response to a pulse of said indication carrier supplied by any one of said generators and thereby operate each station code following relay, means at each station including a contact of its code following relay having connection to its coding unit to operate the unit after the operation is initiated, a check relay at each said station, circuit means at each station including a contact of the code following relay and a contact of the transmitting relay of the same station having connection to the station check relay and operative to energize the check relay when said code following relay and said transmitting relay are operated out of correspondence, means at each station including a contact of its check relay open when energized to render the station keying means ineffective and thereby suppress the supply of the indication carrier when two or more stations interfere by attempting to send coded indication carrier simultaneously; other circuit means at each said station having connection to the station code following relay and including a local current source, a contact controlled by the station check relay and a contact of the station transmitting relay to operate said code following relay and thereby operate the associated coding unit; a first and a second separation relay at each said station, each said first relay having connection to the associated coding unit and energized at a selected code step of the operation of the unit, means at each station including a contact of its said first relay to restore the effectiveness of its keying means and thereby send indication carrier from the interfering station first to energize its said first relay, circuit means at each station including a contact controlled by its check relay, a contact of its code following relay and a back contact of its said first relay to energize its said second relay, and means at each station including a contact of its said second relay when energized to render its coding unit inoperative.

10. In combination, a plurality of spaced stations each provided with an indication generator each of which generators is adapted to supply a carrier of the same given indication frequency when energized, a transmitting channel common to all of said stations and coupled to each of said generators, coding units one for each of said stations, each said coding unit adapted to be operated at a code pattern individual for the unit, starting means at each said station having connection to its coding unit and effective at times to initiate the code operation of said unit, keying means at each said station having connection to its generator and including a contact of the coding unit to start and stop the generator in step with the code pattern of the unit, a receiver at each said station coupled to said channel and including a detector and a code following relay, each said receiver responsive to a carrier of a second frequency different from said given frequency, retransmitting means coupled to said channel and including a detector responsive to said given frequency carrier and having means to supply a carrier of said second frequency and operative to supply said second frequency carrier coded in step with the code of said given frequency carrier supplied by any one of said stations, means at each station including a contact of its code following relay having connection to its coding unit to operate the unit once the operation is initiated by its starting means, a check relay at each said station, pickup circuit means at each said station including a contact of its code following relay and a contact of its coding unit having connection to its check relay to energize the check relay when the code following relay and the coding unit are operated out of correspondence, a stick circuit for each said check relay including a contact controlled by the associated coding unit, means at each station including a contact of its check relay interposed in its keying means to render its keying means ineffective when the check relay is energized, whereby the supply of said indication carrier is suppressed when two or more stations interfere by attempting to supply the indication carrier simultaneously; means at each said station having connection to its code following relay and including a local source of current and a contact controlled by said check relay when energized to operate the code following relay and thereby operate its coding unit; separation means at each of said stations including a first and a second relay, each said first relay having connection to the coding unit of the same station and energized at a selected code step of the unit, circuit means at each said station controlled by its said first relay when energized to restore the effectiveness of the keying means whereby indication carrier is supplied from the interfering station first to energize its said first relay; circuit means at each said station including a back contact of its said first relay, a contact controlled by its check relay and a contact of its code following relay to energize its said second relay; and means at each station controlled by its said second relay when energized to render its coding unit inoperative.

11. In a system for controlling a device at a station from a remote office and for indicating the position of the device at the office, a transmitter and a receiver at the office and at the station, said office and station transmitters including means effective to generate a carrier of a first and a second frequency respectively, said office and station receivers including means effective to detect a carrier of said second and first frequency respectively, the output of said office transmitter being electrically coupled to the input of said station receiver and the output of said station transmitter being electrically coupled to the input of said office receiver; coding means at said office including a control lever, a code transmitting relay means having connections to the office transmitter and operative to key the transmitter and provide a control code of the first frequency carrier individual for said device, and a selector relay for said station energized during a designated step of said control code; decoding means at said station including a code following relay and a code receiving relay means having connections to the station receiver and operative to interpret control codes of said first frequency carrier applied to that receiver, said code receiving relay means including a station relay energized during said designated step of said control code, circuit means at said station including an energized position contact of said station relay connected to said station transmitter and effective when said station decoding means is receiving said control code to key said station transmitter to provide a pulse of said second frequency carrier, decoding means at said office including a code following relay having connection to said office receiver and effective to interpret said pulse of said second frequency carrier, a lockout relay at said office having connection to said office coding means and effective when energized to halt the action of said coding means in transmitting said control code, and other circuit means including a contact of said office code following relay and a contact responsive to said selector relay and effective to energize said lockout relay if said pulse of second frequency carrier is not received on said designated step during said control code.

12. In a system for controlling a device at a station from a remote office and for indicating the position of the device at the office, a transmitter and a receiver at the office and at the station, said office and station transmitters including means effective to generate a carrier of a first and a second frequency respectively, said office and station receivers including means effective to detect a carrier of said second and first frequency respectively, the output of said office transmitter being electrically coupled to the input of said station receiver and the output of said station transmitter being electrically coupled to the input of said office receiver, coding means at said office including a control lever, a code transmitting relay means having connections to the office transmitter and operative to key the transmitter and provide a control code of the first frequency carrier individual for said device, and a selector relay for said station energized during a designated step of said control code; decoding means at said station including a code following relay and a code receiving relay means having connections to the station receiver and operative to interpret control codes of said first frequency carrier applied to that receiver, said code receiving relay means including a station relay energized during said designated step of said control code, circuit means at said station, effective only when said station is in the receiving condition and when said station relay is energized, to key said station transmitter to provide current of said second frequency carrier, decoding means at said office including a code following relay having connection to said office receiver, said office code following relay usually occupying a first position and operated to a second position when said second frequency carrier current is received by said office receiver, a lockout relay at said office having connections to said office coding means and effective when energized to halt the coding action of said office coding means, a lockout circuit means including a first position contact of said office code following relay, a contact closed when said selector relay is energized, and a master contact closed only when said office coding means is transmitting a control code; said lockout circuit means being effective to energize said lockout relay during a control code if said current of said second frequency carrier is not received on said designated code step and during the remainder of said control code, and another lockout circuit means including a second position contact of said office code following relay, a contact closed when said selector relay is not energized, and said master contact; said other lockout circuit means being effective to energize said lockout relay if said current of said second frequency carrier is received during said control code prior to said designated code step.

References Cited in the file of this patent

UNITED STATES PATENTS

| | | |
|---|---|---|
| 2,141,551 | Phinney | Dec. 27, 1938 |
| 2,276,646 | Boswau | Mar. 17, 1942 |
| 2,289,517 | Muether | July 14, 1942 |
| 2,368,826 | Hailes | Feb. 6, 1945 |
| 2,409,696 | Lewis | Oct. 22, 1946 |
| 2,456,533 | Preston | Dec. 14, 1948 |
| 2,559,390 | Blaisdell | July 3, 1951 |